April 27, 1943.　　　　W. A. RAY　　　　2,317,639
FLUID CONTROL VALVE
Filed May 14, 1940　　　3 Sheets-Sheet 1
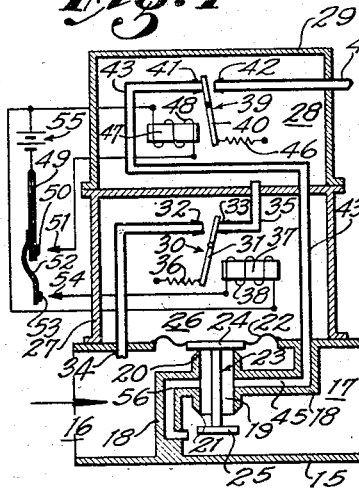
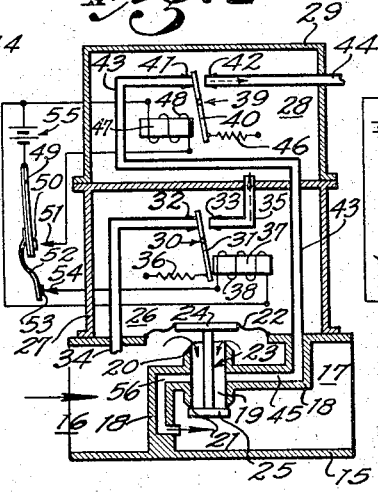
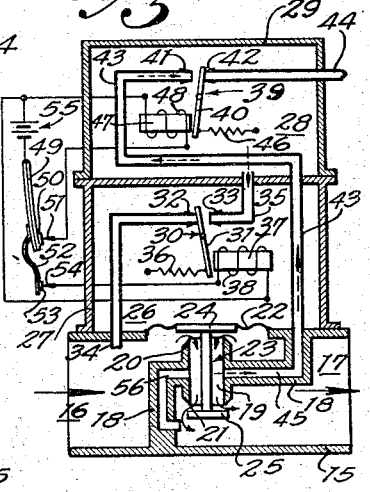
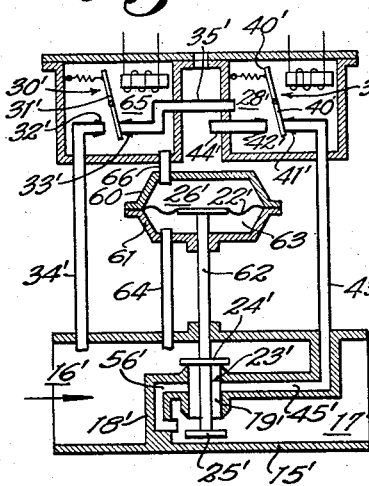
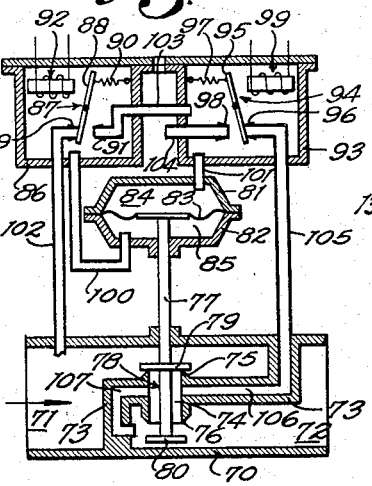
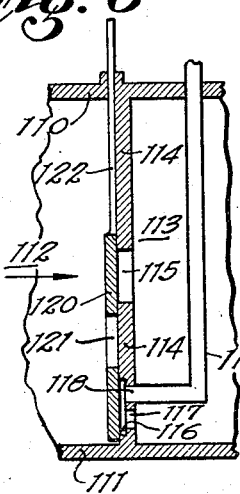
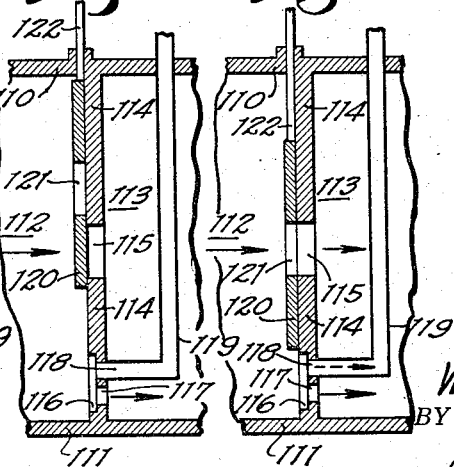
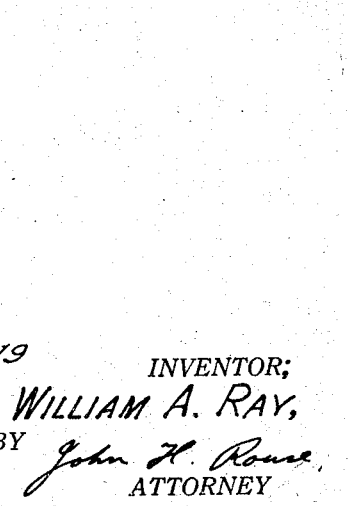
INVENTOR;
WILLIAM A. RAY,
BY John H. Rouse,
ATTORNEY

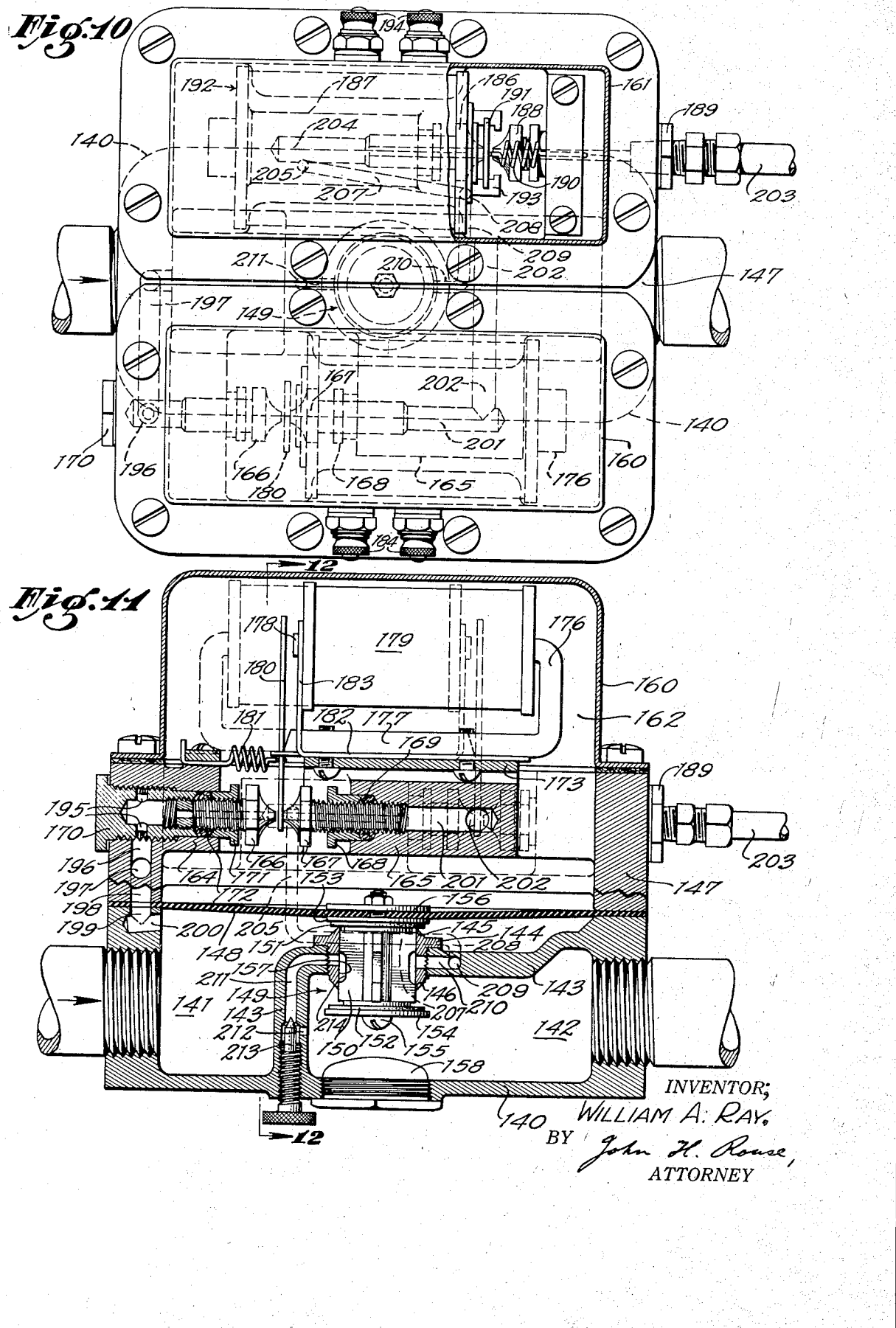

April 27, 1943.  W. A. RAY  2,317,639
FLUID CONTROL VALVE
Filed May 14, 1940  3 Sheets-Sheet 3
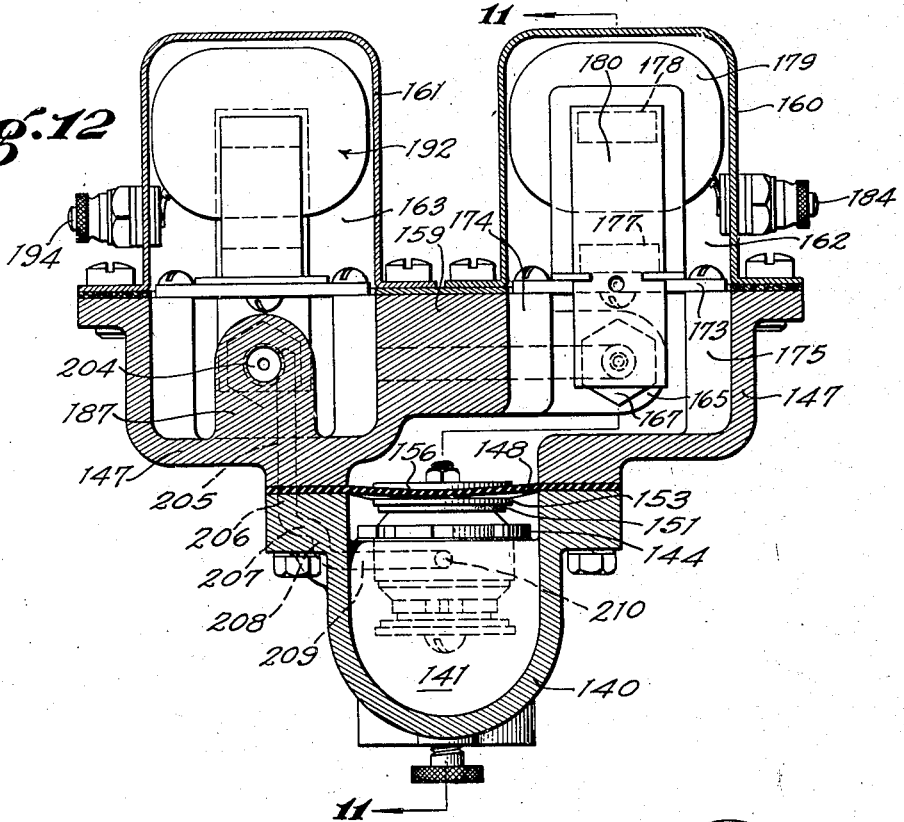
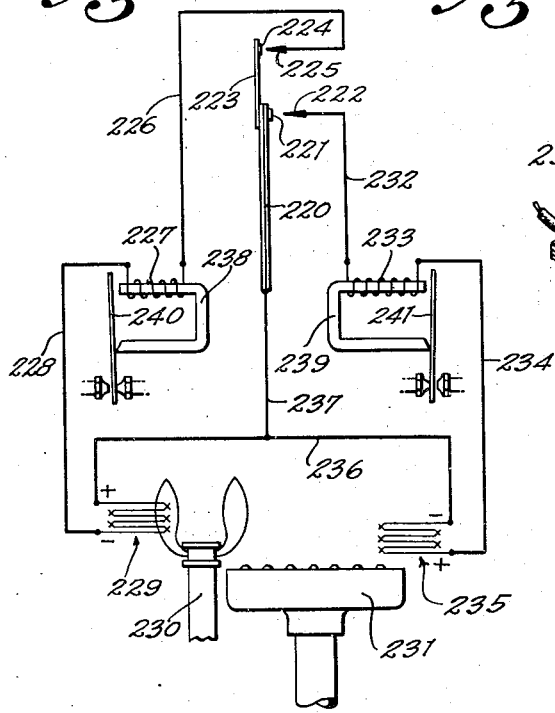
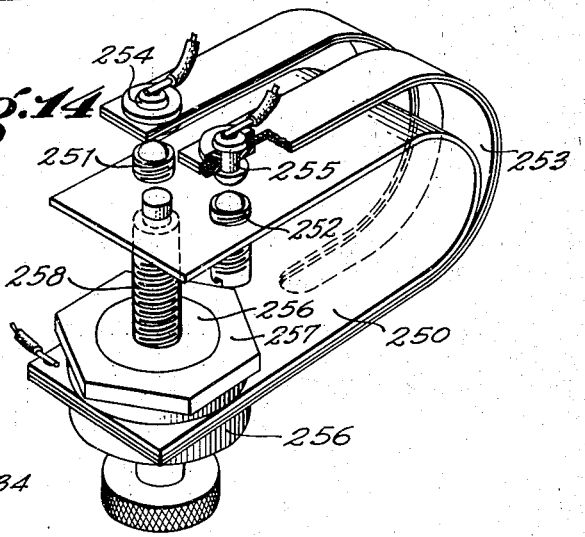
INVENTOR,
WILLIAM A. RAY.
BY John H. Rouse,
ATTORNEY Patented Apr. 27, 1943

2,317,639

UNITED STATES PATENT OFFICE 2,317,639

FLUID CONTROL VALVE

William A. Ray, Glendale, Calif.

Application May 14, 1940, Serial No. 335,085

8 Claims. (Cl. 137—144)

My present invention relates to fluid control valves and particularly to those of the type wherein the valve is operated by the pressure of the fluid controlled thereby. Valves of this type have particular utility in the control of fluid fuel, such as ordinary gas, in heating apparatus. As commonly constructed, the valve assumes in operation either a fully open or a closed position. In many heating applications, however, it is desirable that the valve also be capable of providing a restricted flow of fuel. It is therefore an object of my invention to provide a valve of the type described whereby either "high-fire" or "low-fire" condition of a burner, controlled by the valve, may be produced; in addition to complete shut-off.

It is another object of my invention to provide a valve of the type described which, when operated from closed to "low-fire" position, provides an initial high flow of fuel to the burner to ensure proper and complete ignition.

It is another object to provide, in a valve, a closure member which is normally moved to one position by a motor operated by the pressure of the fluid controlled by the valve, and means controlled by the closure member for applying the pressure of the fluid to the motor so as to oppose the pressure urging the closure member to said one position whereby it is balanced between its limits of movement.

Another object is to provide, in a valve, motor means, operated by the pressure of the fluid controlled by the valve, for moving a closure member between limiting positions wherein respectively no flow and restricted flow through the valve is permitted, and means for so controlling the motor that the closure member is balanced in a position intermediate its limiting positions wherein full flow through the valve is permitted.

Another object is to provide a novel thermoelectric generating system for the energization of electromagnetic pilot valves adapted to control the valve of my present invention.

Another object is to provide a novel thermostatic device for controlling the aforesaid pilot valves.

Other objects and advantages of my invention will be found in the description, the drawings, and the appended claims.

For complete understanding of the invention, reference may be had to the following detailed description and accompanying drawings, wherein:

Figures 1, 2 and 3 are diagrammatic views of a valve embodying my invention, together with apparatus suitable for controlling the same, the parts being shown in the several views in the positions which they assume in operation;

Figures 4 and 5 are diagrammatic views of two modified forms of a valve embodying my invention;

Figures 6, 7 and 8 are diagrammatic views of a modified form of closure member, adapted for use in the valve of my invention, showing the member in its several controlling positions;

Figure 9 is a diagram of a modified electric circuit and apparatus suitable for controlling the valve of my invention;

Figure 10 is a plan view, with cover partly broken away, of a valve embodying my invention;

Figure 11 is a sectional view of the valve shown in Fig. 10 taken along the irregular line 11—11 of Fig. 12;

Figure 12 is a transverse section taken along the line 12—12 of Fig. 11;

Figure 13 is diagrammatic view of a preferred control system for the valve shown in Figs. 10–12, including thermoelectric generating means; and Fig. 14 is a perspective view of a thermostatic device adapted to control the valve of my invention.

Referring first to Figs. 1, 2 and 3 of the drawings, the numeral 15 indicates a valve casing having an inlet 16 and an outlet 17 separated by a partition 18. This partition has a main port opening 19 therethrough, provided at its upper and lower ends, respectively, with valve seats 20 and 21. A flexible diaphragm 22, covering an opening in the top wall of the valve casing, carries a closure member 23 provided with an upper 24 and a lower 25 valve member cooperable, respectively, with the seats 20 and 21. Defining, with the valve casing, a pressure chamber 26 above the diaphragm 22, is a housing 27. Secured to the top of this housing, and defining therewith another chamber 28, is another housing 29.

Mounted in the chamber 26 is a first electromagnetically operated pilot valve 30 comprising a pivoted armature 31, the upper end portion of which serves as a closure member for jets 32 and 33, which are connected respectively by pipes 34 and 35 with the inlet 16 and the chamber 28. The armature is normally held in engagement with jet 33 by the force of a spring 36 and is movable, when core 37 is energized by current flow in coil 38, into engagement with the other jet 32. Mounted in the chamber 28 is a second electromagnetically operated pilot valve 39, similar to the pilot valve 30, and comprising a pivoted armature 40, the upper end portion of which is cooperable with jets 41 and 42 which are connected respectively by pipes 43 and 44 with a passageway 45 formed in the partition 18 and communicating with the port 19, and with the atmosphere. The armature is biased by a spring 46 into engagement with the jet 41 and is movable, when core 47 is energized by current flow in coil 48, into engagement with the jet 42.

A thermostat suitable for automatic control of the valve comprises a bimetallic member 49 which carries a contact element 50 cooperable with a fixed contact 51 connected to one terminal of the coil 48. Secured to the bimetallic member is a flexible arm 52 which carries another contact element 53 cooperable with another fixed contact 54 connected to one terminal of the coil 38. The other terminals of the coils are connected together and to the bimetallic member through a source of current 55. The contacts are so arranged that, in the anticlockwise movement of the bimetallic member from the position shown in Fig. 1, engagement of the elements 53 and 54 is effected before that of elements 50 and 51; the flexibility of the arm 52 permitting the subsequent additional engagement of the latter pair. Similarly, when the bimetallic member subsequently moves in the opposite direction, elements 50 and 51 are disengaged before elements 53 and 54.

Assuming that the valve shown in Figs. 1-3 is connected to supply gas to the burner of a furnace for heating a space wherein the thermostatic member 49 is located, with the parts in the positions shown in Fig. 1, flow through the valve is completely obstructed by the valve member 24 which is maintained by gravity in engagement with the seat surrounding the inlet end of port 19; fluid pressure above and below the diaphragm 22 being equalized by the open jet 32 of pipe 34, and the chamber 26 being closed from the atmosphere by the engagement of the armature with jet 33.

On cooling, the bimetallic member 49 moves in an anticlockwise direction and thus, if the temperature in the space falls, the contacts 53 and 54 engage and current flows in coil 38, energizing the core 37 to attract the lower end of the armature which assumes the position shown in Fig. 2. Jet 32 now being closed and jet 33 open, the fluid which was compressed in chamber 26 escapes to the atmosphere through pipe 35, chamber 28 and pipe 44, as indicated by the broken arrows in Fig. 2. The pressure of the fluid in the inlet 16 can now force the diaphragm upward, the closure member assuming the position shown in Fig. 2 with the valve member 25 in engagement with the lower or outlet end of the port 19. In this position of the closure member, fluid can flow to the burner through a restricted passageway 56 formed in the partition 18 and interconnecting the port 19 and the outlet 17. A "low-fire" condition thus now exists at the burner, it being assumed that the fuel was ignited by a continuously burning pilot burner or other igniting means.

It will be noted that the closure member, in passing from the position shown in Fig. 1 to that shown in Fig. 2, passed through an intermediate position (shown in Fig. 3) wherein both ends of the port 19 were open. A momentary high flow of fuel to the burner was thus permitted which ensured proper and complete ignition.

If, in spite of the low-fire condition of the furnace burner, the space continues to cool, the bimetallic member will move farther, effecting engagement of contacts 50 and 51 in addition to that of contacts 53 and 54. The core 47, thus being energized, magnetically moves the armature 40 to the position shown in Fig. 3 wherein jet 41 is open and jet 42 closed. Fluid can now flow, as indicated by the broken arrows in Fig. 3, from the relatively high pressure zone existing in port 19 (the lower end of which is closed) through passageway 45, pipe 43, open jet 41, chamber 28 (which is now closed from the atmosphere), pipe 35, and open jet 33 into the pressure chamber 26 above the diaphragm which was previously at atmospheric pressure. The resultant increase in pressure above the diaphragm, opposing that below it, permits the closure member to fall to the intermediate position shown in Fig. 3 wherein it is balanced by the pressure and its weight. The factor controlling the balance is the pressure drop across the upper end of port 19 which increases as the member 24 approaches the seat 20. The resistance of the jet openings, which in practice are preferably quite small, has no effect on the final balance of the closure member, as the pressure is then static.

In the balanced position of the closure member, full flow through the valve is permitted to effect a "high-fire" condition at the burner. If the temperature in the space now rises, the thermostatic member will move in a clockwise direction to first open contacts 50 and 51, with the result that armature 40 will be released, closing jet 41 and opening jet 42. The compressed fluid can then escape from the chamber 26 to the atmosphere and the closure member will reassume its "low-fire" position as shown in Fig. 2. Under normal heating conditions, the valve will be operated intermittently between its low- and high-fire positions. Should the temperature in the space rise above a predetermined degree, both pairs of thermostat contacts will open, deenergizing pilot valve 30 and thus subjecting the chamber above the diaphragm to the full pressure of the fluid to completely shut-off fuel supply to the burner.

The valve diagrammatically shown in Fig. 4 is substantially identical with the valve shown in Figs. 1-3 and completely described hereinabove. The only essential difference between the valves is in the location of the parts, and therefore the numerals indicating the major parts of the valve shown in Fig. 4, corresponding to those in the valve shown in Figs. 1-3, have been primed. The diaphragm 22' is in a separate housing comprising members 60 and 61 and is connected to the closure member 23' by a stem 62. The lower diaphragm chamber 63 is permanently connected by a pipe 64 with the inlet 16'. The pilot valve 30' is in a separate compartment 65 which is permanently connected by a pipe 66 with the upper diaphragm chamber 26'. The operation of this valve is identical with that of the one shown in Figs. 1-3 and therefore further description thereof is deemed unnecessary. It is to be understood that the area of the valve member 24' is small with respect to that of the diaphragm and therefore the lifting of the diaphragm is not substantially hindered by the fluid pressure above member 24'. The main reason for the inclusion of the showing of Fig. 4 is so that the valve shown in Fig. 5, which employs a different fluid circuit, may more readily be compared.

In the valve shown in Fig. 5 the closure member is maintained in closed position by the aid of atmospheric pressure above and below the diaphragm, whereas in the valve shown in Fig. 4 (and in Figs. 1–3) gas pressure is employed for that purpose. The fluid control circuit of this valve is therefore modified so that the same results may be accomplished. Otherwise, the valve is substantially identical in construction and operation with the valve shown in Fig. 4.

Referring more particularly to Fig. 5, the numeral 70 indicates a valve casing having an inlet 71 and an outlet 72 separated by a partition 73 having a main port opening 74 therethrough provided at its opposite ends with an upper and a lower valve seat 75 and 76, respectively. Connected to a stem 77, extending through an opening in the upper wall of the valve casing, is a closure member 78 provided with an upper 79 and a lower 80 valve member cooperable respectively with the seats 75 and 76. A motor for operation of the closure member comprises a pair of housing members 81 and 82 separated by a diaphragm 83 to form an upper 84 and a lower 85 pressure chamber. The upper end portion of the closure member stem 77 sealingly extends through an opening in the lower housing member and is secured to the diaphragm. Mounted in a housing 86 is a first electromagnetically operated pilot valve 87 comprising a pivoted armature 88, the lower end of which is normally held in engagement with a fluid control jet 89, by a spring 90, and is movable therefrom into engagement with another jet 91 when an electromagnet 92 is energized. Mounted in another housing 93 is a second electromagnetically operated pilot valve 94, similar to the pilot valve 87, and comprising a pivoted armature 95, the lower end of which is normally held in engagement with a jet 96, by a spring 97, and is movable therefrom into engagement with another jet 98 when the upper end portion of the armature is attracted by an electromagnet 99. The chamber 85, below the diaphragm, is connected by a pipe 100 with the space within the housing 86, and the chamber 84, above the diaphragm, is connected by a pipe 101 with the space within the housing 93. The jet 89 is connected by a pipe 102 with the inlet 71, the jet 91 is connected by a pipe 103 with the space within the housing 93, the jet 98 is connected directly to the atmosphere by a pipe 104, and jet 96 is connected by a pipe 105 with a passageway 106 formed in the partition 73 and communicating with the port 74.

The operation of the valve shown in Fig. 5 is as follows: When the valve is in its normal condition with the parts in the position shown, and assuming that it is connected to supply fuel to a gas burner, both of the diaphragm chambers 84 and 85 are at atmospheric pressure by reason of the open jets 91 and 98 and therefore the closure member 78, being gravity biased, is in its downward position with the valve member 79 closing port 74, the pressure of the fluid on the top of member 79 aiding in tightly closing it. Fuel flow through the valve is thus completely obstructed. If the electromagnet 92 is energized, the lower end of armature 88 is moved away from jet 89 and into engagement with jet 91. Fluid can now flow from the inlet 71 through pipes 102 and 100 into the lower pressure chamber 85. The upper chamber 84 still being at atmospheric pressure, the diaphragm 83 is lifted, moving the closure member 78 upward so that its valve member 80 engages the seat 76. In this position, the upper end of port 74 is open and fuel can flow to the burner through a restricted opening 107, formed in the partition and interconnecting the port 74 and the outlet 72. A low-fire condition of the burner thus results. If the electromagnet 99 is additionally energized, the lower end of armature 95 is moved away from jet 96 and into engagement with jet 98, thereby sealing the upper diaphragm chamber 84 from the atmosphere and permitting a momentary flow thereinto of the high pressure fluid from the inlet 71 through port 74, passageway 106, pipe 105, jet 96, and pipe 101. The pressure differential across the diaphragm thus being decreased permits the closure member to fall to a point at which the pressure drop across the inlet end of the port 74 is sufficient to carry it. With the closure member balanced in this position, both ends of the port are open and full flow of fuel to the burner is permitted. It is thus seen that the operation of the valve shown in Fig. 5 is fundamentally identical with that of the valves shown in Figs. 1–3 and 4.

In Figs. 6, 7 and 8, wherein a modified form of closure member is disclosed, the numerals 110 and 111 indicate, respectively, the upper and the lower wall of a valve casing having an inlet 112 and an outlet 113 separated by a vertical partition 114 having a main opening 115 therethrough and an inlet recess 116, communicating with which is a restricted opening 117 leading to the outlet and another opening 118 to which is connected a pipe 119, corresponding in function to the pipe 43 shown in Figs. 1–3. A slidable closure member 120, cooperable with the openings in the partition and having an opening 121 therethrough, is provided with an operating stem 122 extending through an opening in the upper wall of the casing and adapted to be connected to a motor such as that shown in the preceding figures.

The positions of the closure member 120 shown in Figs. 6–8 correspond, respectively, to those of the closure member 23 shown in Figs. 1–3. In the normal position of the closure member as shown in Fig. 6, flow through the valve is completely obstructed; in the elevated position of the closure member as shown in Fig. 7, restricted flow is permitted through the opening 117; and in the balanced position of the closure member as shown in Fig. 8, full flow is permitted through the coinciding main openings 121 and 115. In view of the foregoing, it is apparent that the valve of my present invention is not restricted to the use of a specific form of closure member.

In the system shown in Figs. 1–3, a "three-wire" thermostat is shown for controlling the pilot valves. However, the system may also be controlled by a "two-wire" thermostat, as is demonstrated in the circuit diagram of Fig. 9. In this figure, the numeral 125 indicates a bimetallic member carrying a first contact element 126 cooperable with a fixed contact 127. A second contact element 128, cooperable with a fixed contact 129, is flexibly connected to the bimetallic member by a resistance element 130. The fixed contacts are connected together and, through a source of current 131, to one terminal of each of the electromagnets 132 and 133. The other terminals of the electromagnets are connected together and to the bimetallic member.

When the bimetallic member 125 moves in a clockwise direction, the contacts 128 and 129 first engage and current flows through both of the electromagnets. However, the resistance 130 is now in the circuit and so the current is relatively weak but sufficient to energize electromagnet 132 to attract its armature 134, this electromagnet being designed for more sensitive operation than that of the other electromagnet 133. On further movement of the bimetallic member, contacts 126 and 127 additionally engage, short-circuiting resistance 130, and current flows through the parallel connected electromagnets in an amount sufficient to also energize the less sensitive electromagnet 133 to attract its armature 135. The electromagnets 132 and 133 correspond, respectively, to the electromagnets 37—38 and 47—48 of the system shown in Figs. 1–3.

In Figs. 10–12 I have shown a practical embodiment of the valve diagrammatically shown in Figs. 1–3. The pilot valve structure shown in Figs. 10–12 are substantially the same as those disclosed in my copending applications Serial No. 256,123, filed February 13, 1939, and Serial No. 279,220, filed June 14, 1939.

In Figs. 10–12, the numeral 140 indicates a valve casing having an inlet 141 and an outlet 142 separated by an integrally formed partition 143. Threaded in an opening formed in this partition is a hollow member 144, the inner surface of which defines an elongated valve port 157, and the ends of which are formed to provide annular valve seats 145 and 146. Secured at its margin between the casing and an upper casing section 147 is a generally rectangular diaphragm 148, of material such as leather or artificial rubber, which carries at its center a closure member generally indicated at 149 and comprising a vaned valve guide member 150, at either end of which is a valve member disk 151 and 152, cooperable respectively with the seats 145 and 146, and backed by metal washers 153 and 154; the parts being held together and to the diaphragm by a screw 155 with a stiffening washer 156 thereabove. To permit assembly of the closure member in the port 157, an opening is formed in the bottom wall of the valve casing, which opening is normally closed by a threaded plug 158.

The upper casing section 147 is divided by an integrally formed wall or partition 159 (Fig. 12) into a pair of spaces which, with housings 160 and 161, form a pair of chambers 162 and 163, corresponding respectively to the chambers 26 and 28 of the valve shown in Figs. 1–3, the chamber 162 communicating directly with the space above the diaphragm 148. Mounted in spaced hollow boss portions 164 and 165, projecting from the partition 159, are pilot valve jet members 166 and 167, respectively. The jet member 167 is threaded directly in the boss 165 and is held in adjusted position by a nut 168, threaded on the jet member and compressed against a packing member 169. The other jet member 166 is threaded in a capped sleeve 170 which itself is threaded in an opening formed in a side wall of the section 147 and in the boss 164. A nut 171, threaded on the jet member 166 and compressed against a packing member 172, holds this jet member in adjusted position in its sleeve.

Mounted within the housing 160, by means of a plate 173 secured to bosses 174 and 175, is an electromagnetic operator for the pilot valve. This operator comprises a U-shaped magnetic core 176 secured by its lower arm 177 to the plate 173 and carrying on its upper arm 178 an energizing coil 179, which is electrically connected to terminals 184 insulatingly mounted in the side wall of housing 160. Fulcrumed on the beveled end of the core arm 177 is an armature 180, the lower end portion of which is held in engagement with the area surrounding the opening in jet 167 by the force of a compression spring 181. The armature extends through and is guided by an apertured member 182, interposed between the core arm 177 and the plate 173, and having an upwardly bent portion 183 which is apertured to receive the end portion of the upper core arm 178 and thus hold it rigidly with respect to its other arm. When the core 176 is energized by passage of current through coil 179, the upper end of the armature 180 is attracted toward the end of core arm 178 and thus the lower end of the armature is moved away from jet 167 and into engagement with jet 166, obstructing fluid flow therethrough. For sensitive operation of the pilot valve, the positions of the jets are adjusted so that the clearance between an unengaged jet and the armature is approximately 0.005 inch, and also so that there is a similar clearance between the armature and the end of the core arm 178 when the armature is in its attracted position.

Mounted in the other chamber 163, defined by the casing section 147 and the housing 161, is another electromagnetically operated pilot valve which is identical in general construction with the pilot valve described above in connection with Figs. 10–12. One of its jet members 186 is mounted in a boss 187 (Fig. 12) projecting from the bottom of the casing section, and the other jet member 188 is mounted in a sleeve 189 (Figs. 10 and 11) threaded in a side wall of the section. Cooperable with these jets to control fluid flow therethrough, and normally held in engagement with the jet 186 by a compression spring 190, is an armature 191 controlled by an electromagnet generally indicated at 192 and identical with that described in the preceding paragraph. A guide member for the armature, corresponding to the other armature-guide member 182, is shown at 193. Terminals 194 are provided for electrical connection to the electromagnet 192.

The fluid control circuit of the valve shown in Figs. 10–12, which is identical with that of the valve diagrammatically shown in Figs. 1–3, will now be traced. The jet member 166 is connected to the inlet 141 by openings 195 in the sleeve 170, vertical passage 196, horizontal passage 197, coinciding vertical passages 198 and 199, and branch passage 200; all of which passages are formed or bored in the end wall of the casing section and of the casing. Jet member 167 is connected to the chamber 163 by passages 201 and 202 formed in the boss 165 and partition 159. Jet member 188 is connected directly to the atmosphere through an opening in the outer end or cap of its supporting sleeve 189. In practice, this connection is usually extended to a space within a furnace by a vent pipe 203. Jet 186 is connected to port 157 by passage 204 in boss 187, downward passages 205 and 206 in the casing section and the casing, angular horizontal passage 207 in the casing, short vertical passage 208, and horizontal passage 209 and branch passage 210 in the partition 143. All, or most of, these passages are preferably formed by coring the casing and casing section.

Also formed in the partition 143, and interconnecting the port 157 and the outlet 142, is a passage 211 and an opening 212. A needle valve 213, threaded in the lower end of the passage, serves to adjust the flow through the opening. So as to prevent possible obstruction of the port openings of passages 210 and 211 by the vanes of the valve guide member 150, the vanes are notched adjacent the openings as indicated at 214.

As the operation of the valve shown in Figs.

10–12 is identical with that of the valve shown in Figs. 1–3, and fully described hereinbefore, further description is deemed unnecessary.

In Fig. 13, wherein I have shown a preferred electrical circuit for the valve shown in Figs. 10–12 when it is employed to control the supply of fuel to a gas-consuming heating device, the numeral 220 indicates a bimetallic member, responsive to the result of the heating, and carrying a first contact element 221, cooperable with a fixed contact 222. Secured to the bimetallic member is a flexible arm 223 which carries a second contact element 224, cooperable with another fixed contact 225. The fixed contact 225 is connected by a wire 226 to one terminal of an electromagnet coil 227, the other terminal of which is connected by a wire 228 to one terminal of a thermoelectric generating device or thermopile 229 which is so arranged as to be heated by the flame of a pilot burner 230 for a main burner 231. Similarly, the fixed contact 222 is connected by a wire 232 to one terminal of another electromagnet coil 233, the other terminal of which is connected by a wire 234 to one terminal of another thermopile 235 which is arranged to be heated by the flame of the main burner 231. The other terminals of the thermopiles are connected together by a wire 236 and to the bimetallic member by wire 237. Adapted to be energized respectively by current flow in the coils 227 and 233 are U-shaped cores 238 and 239 with which jet-controlling armatures 240 and 241 are respectively cooperable.

The jets with which armature 240 cooperates correspond to the jet 32 and 33 of the valve shown in Figs. 1–3 and serve to control the initial operation of the main closure member from closed to "low-fire" position when contacts 224 and 225 engage with fall of temperature at the bimetallic member. Current for the operation of this armature is provided by the thermopile 229 which is heated by the flame of the continuously burning pilot burner 230. The system is therefore always in condition for initial operation. When the main burner is in "low-fire" condition, the other thermopile is heated and current is then available for the operation of the other armature 241, which cooperates with jets corresponding to those shown at 41 and 42 in Figs. 1–3, and serves to control the operation of the closure member from low- to high-fire position when contacts 221 and 222 additionally engage. By this arrangement, the system is always ready for operation with minimum consumption of fuel for current generating purposes. If the pilot burner flame is accidentally extinguished, armature 240 is released and the main valve closes and cannot be reopened until the pilot burner is relighted, thus rendering the system "safe."

Another advantage of the arrangement shown in Figs. 1–3 resides in the fact that, when both of the pairs of thermostat contacts are engaged and thus both of the pilot valve operators energized, the thermostat is connected across points of equipotential in the circuit and therefore no current flows through the bimetallic member and wire 237; it being assumed that the thermopiles are connected in series as shown and that their generated E. M. Fs. are equal, and also that the resistances of the coils, and of the branch circuits, are equal. The circuit then corresponds to a form of balanced Wheatstone bridge circuit, with the thermostat connected in the position usually taken by a null indicator. If a common source of current is employed, as in the circuit shown in Figs. 1–3, when both of the electromagnets are energized current passes through the bimetallic member in an amount equal to the sum of the currents through the two coils; by the arrangement shown in Fig. 13, current flows only in the outer circuit and none (or a small amount, depending on the degree of balance of the bridge arms) passes through the bimetallic member.

In Fig. 14, wherein I have shown a thermostat suitable for use in the control circuits of Figs. 1–3 and Fig. 13, the numeral 250 indicates a U-shaped conducting member, the arms of which are normally urged toward each other by their own resilience. Threaded in the end portion of the upper arm of this member are laterally spaced contact elements 251 and 252. A U-shaped bifurcated member 253, of bimetallic material, insulatingly carries on the end portion of each of its upper spaced arms a contact element, 254 and 255, which are cooperable respectively with the contact elements 251 and 252. The member 250 is nested within the member 253 and the lower arms of the members are clamped together by a short hollow screw 256, which extends through openings formed in the arms, and a nut 257. Threaded in the hollow screw 256 is an adjusting screw 258, the reduced upper end portion of which freely extends through an opening in the upper arm of the member 250, the shoulder of the screw adjacent its reduced end portion engaging the underside of the arm. The contact element 251 is adjusted so that it is slightly closer to contact 254 than contact 252 is to contact 255; contact 254 is therefore connected to the coil of the electromagnet which is to be energized first. The adjusting screw 258 controls the temperature setting of the thermostat, the same differential of engagement of the pairs of contacts being maintained at different settings. As shown, the connecting leads are preferably soldered directly to the contact elements 254 and 255 and to the contact-carrying member 250.

While I have herein shown illustrative embodiments of my invention which I have described in connection with the control of a gas-consuming heating device, it is to be understood that the valve of my invention is capable of other uses and that modifications may be made without departing from the spirit of my invention. I intend, therefore, that my invention be limited only by the scope of the appended claims.

I claim as my invention:

1. In a fluid control valve: a valve body having an inlet and an outlet; a partition separating said inlet and said outlet and having a main port opening and a restricted port opening, each adapted to interconnect the inlet and the outlet; a closure member for controlling said openings and movable in opposite directions between a first position, wherein both of said openings are closed, and a second position, wherein only said main opening is closed; a fluid-pressure motor for operating said closure member; means for selectively influencing said motor by pressure of the fluid controlled by the valve to cause the motor normally to move the closure member either to the first or second position; means defining a passageway adapted to be placed into communication with said inlet and controlled by said closure member to interrupt said communication when the closure member is in said first position and thereby reduce the pressure in said passageway, and to establish communication when the closure member moves away from its first position and thereby increase the pressure in said passageway; said passageway being capable of communicating with said motor to apply the pressure of said fluid, as controlled by the position of the closure member between its extreme positions, to the motor in a sense opposite to that of the fluid pressure tending to move the closure member to said second position, so that the closure member may be maintained in a position intermediate said first and said second positions wherein said main port opening and said passageway are open; and means for controlling said communication of the passageway with the motor.

2. In a fluid control valve: a valve body having an inlet and an outlet; a partition separating said inlet and said outlet and having a main port opening and a restricted port opening, each adapted to interconnect the inlet and the outlet; a closure member operable to control said openings and movable between a first position, wherein both of said openings are closed, and a second position, wherein only said main opening is closed; means biasing said closure member to said first position; a fluid-pressure motor comprising means defining a pair of pressure chambers separated from each other by a movable partition; means connecting said movable partition with said closure member; means for applying the inlet pressure of the fluid controlled by the valve to one of said motor chambers to urge said closure member toward said second position; means defining a passageway adapted to be placed into communication with said inlet and controlled by said closure member to interrupt said communication when the closure member is in said first position and thereby reduce the pressure in said passageway, and to establish communication when the closure member moves away from its first position and thereby increase the pressure in said passageway; said passageway being capable of communicating with said motor to apply the pressure of said fluid, as controlled by the position of the closure member between its extreme positions, to the other of said chambers so that the closure member may be maintained in a position intermediate said first and said second positions wherein said main port opening and said passageway are open; and means for controlling said communication of the passageway with the motor.

3. In a fluid control valve: a valve body having an inlet and an outlet; a partition separating said inlet and said outlet and having a main port opening and a restricted port opening, each adapted to interconnect the inlet and the outlet; said partition also providing a control opening; a closure member operable to control said openings and movable between a first position, wherein all of said openings including the control opening are closed with respect to said inlet and are subjected to pressure substantially less than in the inlet, a second position, wherein the inlet pressure is transmitted through all of the said openings except said main opening, and an intermediate position wherein all of said openings are open and said control opening is subject to an intermediate pressure dependent on such intermediate position of the closure; said closure member being biased to said first position; a motor comprising means defining a pair of pressure chambers separated from each other by a movable partition; means connecting said movable partition with said closure member; means, including a first pilot valve, for applying the pressure of said fluid to one of said chambers to urge said closure member toward said second position; and means, including a second pilot valve, fluidly connecting the other of said chambers with said control opening; all whereby: fluid flow through the valve is obstructed when the closure member is in said first position, restricted flow through the valve is permitted when the closure member is in said second position, and full flow through the valve is permitted when the closure member is maintained in a position intermediate said first and said second positions by fluid pressure in the other of said chambers opposing the fluid pressure in the one of said chambers.

4. In a fluid control valve: a valve body having an inlet and an outlet; a partition separating said inlet and said outlet and having a port opening therethrough; a first valve seat formed at the inlet end of said port and a second valve seat at the outlet end thereof; a closure member cooperable with said seats and comprising a pair of interconnected and spaced-apart valve members; said closure member being movable between a first position, wherein one of said valve members is in engagement with said inlet seat, and a second position, wherein the other of said valve members is in engagement with said outlet seat; said closure member being biased to said first position; said closure member being adapted to assume a position intermediate said first and said second positions wherein both of said valve members are out of engagement with said seats; a motor comprising means defining a pair of pressure chambers separated from each other by a movable partition; means connecting said movable partition with said closure member; means for applying the pressure of the fluid controlled by the valve to one of said chambers to urge said closure member toward said second position; said port having an opening terminating intermediate said seats and capable of communicating with the other of said chambers whereby the pressure of said fluid may be so applied to said motor as to maintain said closure member in said intermediate position; and means for controlling said communication of the intermediate opening with the other chamber; said port having an additional opening terminating intermediate said seats and communicating with said outlet, whereby fluid is passed through the valve when the closure member is in said second position.

5. In a fluid control valve: a valve body having an inlet and an outlet; a partition separating said inlet and said outlet and having a port opening therethrough; a first valve seat formed at the inlet end of said port and a second valve seat at the outlet end thereof; a closure member cooperable with said seats and comprising a pair of interconnected and spaced-apart valve members; said closure member being movable between a first position, wherein one of said valve members is in engagement with said inlet seat, and a second position, wherein the other of said valve members is in engagement with said outlet seat; said closure member being biased to said first position; said closure member being adapted to assume a position intermediate said first and said second positions wherein both of said valve members are out of engagement with said seats; a motor comprising means defining a pair of pressure chambers separated from each other by a movable partition; means connecting said movable partition with said closure member;

means, including a first pilot valve, for applying the pressure of said fluid to one of said chambers to urge said closure member toward said second position; said port having an opening intermediate said seats and connected to a passageway communicating with the other of said chambers; and a second pilot valve controlling said passageway whereby, when said closure member is in said second position, the pressure of said fluid may be so applied to said motor as to maintain said closure member in said intermediate position; said port also having an opening intermediate said seats and communicating with said outlet, whereby fluid is passed through the valves when the closure member is in said second position.

6. In a fluid control valve: a valve casing having an inlet and an outlet; a partition separating said inlet and said outlet and having a port opening therethrough; a first valve seat formed at the inlet end of said port, and a second valve seat at the outlet end thereof; and a closure member cooperable with said seats and comprising a pair of interconnected and spaced-apart valve members; said closure member being movable between a first position, wherein one of said valve members is in engagement with said inlet seat, and a second position, wherein the other of said valve members is in engagement with said outlet seat; said port having a restricted opening intermediate said seats and communicating with said outlet, whereby restricted fluid flow through the valve is permitted when the closure member is in said second position; said closure member being adapted to assume another position, intermediate said first and said second positions, wherein both of said valve members are out of engagement with said seats, whereby full fluid flow through the valve is permitted.

7. In a fluid control valve: a casing having an inlet and an outlet; control means whereby a restricted flow of fluid or a full flow of fluid may be passed through said valve; said control means comprising a partition separating said inlet and said outlet and having a main port opening and a restricted port opening, each adapted to interconnect the inlet and the outlet; a closure member operable to control said openings and movable between a first limiting position, wherein both of said openings are closed, and a second limiting position wherein only said restricted opening is open; said closure member in its movement between said first and second limiting positions passing through an intermediate position wherein both of said openings are open.

8. In a fluid control valve: a casing having an inlet and an outlet; control means whereby a restricted flow of fluid or a full flow of fluid may be passed through said valve; said control means comprising a partition separating said inlet and said outlet and having a main port opening and a restricted port opening, each adapted to interconnect the inlet and the outlet; a closure member operable to control said openings and movable between a first limiting position, wherein both of said openings are closed, and a second limiting position wherein only said restricted opening is open; said closure member being biased to said first position; said closure member in its movement between said first and second limiting positions passing through an intermediate position wherein both of said openings are open.

WILLIAM A. RAY.